US012352579B1

(12) United States Patent
Duenas Arana et al.

(10) Patent No.: US 12,352,579 B1
(45) Date of Patent: Jul. 8, 2025

(54) LOCALIZATION PERFORMANCE METRIC

(71) Applicant: Zoox, Inc., Foster City, CA (US)

(72) Inventors: Guillermo Duenas Arana, San Francisco, CA (US); Nathaniel Jon Kaiser, Boston, MA (US); Brice Rebsamen, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 285 days.

(21) Appl. No.: 17/875,090

(22) Filed: Jul. 27, 2022

(51) Int. Cl.
*G01C 21/28* (2006.01)
*B60W 60/00* (2020.01)
*G08G 1/127* (2006.01)

(52) U.S. Cl.
CPC ............ *G01C 21/28* (2013.01); *B60W 60/001* (2020.02); *G08G 1/127* (2013.01); *B60W 2756/10* (2020.02)

(58) Field of Classification Search
CPC . G01C 21/28; B60W 60/001; B60W 2756/10; G08G 1/127
See application file for complete search history.

(56) References Cited

U.S. PATENT DOCUMENTS

| | | | | |
|---|---|---|---|---|
| 2020/0019160 A1* | 1/2020 | McArthur | ............... | G01S 7/412 |
| 2020/0111011 A1* | 4/2020 | Viswanathan | ......... | G06N 20/10 |
| 2020/0231142 A1* | 7/2020 | Liu | ........................ | G01S 13/931 |
| 2022/0341750 A1* | 10/2022 | Akbarzadeh | ....... | G01C 21/3841 |
| 2022/0398851 A1* | 12/2022 | Nehmadi | ............... | G01S 17/931 |

FOREIGN PATENT DOCUMENTS

CN 114608589 A * 6/2022

\* cited by examiner

*Primary Examiner* — Anne Marie Antonucci
*Assistant Examiner* — Patrick Daniel Mohl
(74) *Attorney, Agent, or Firm* — Lee & Hayes, P.C.

(57) ABSTRACT

Determining a localization performance metric using sensor data is described. A vehicle may capture sensor data from one or more sensors of the vehicle. The sensor data may be input into a localization component to determine localization data (e.g., a location/orientation of the vehicle) and auxiliary location data (e.g., residual data indicating a difference between the measured location/orientation and an actual or estimated location/orientation). The auxiliary localization data (which, in some examples, may include residuals associated with various sensor modalities) may be input into a machine learned model. The machine learned model may generate the localization performance metric. The vehicle may determine an action to take based on the localization performance metric. In some examples, the action may be tied to the performance meeting or exceeding a threshold.

20 Claims, 4 Drawing Sheets

LOCALIZATION PERFORMANCE METRIC

BACKGROUND

Localization is often a process by which an entity determines its location in its environment. That is, by localizing itself, an entity, such as a vehicle, can determine its precise relationship to elements on a map associated with the environment within which the entity is positioned. When used in robotic applications, such as autonomous vehicles, errors in localization can cause undesirable events. In some cases, errors in localization can manifest itself without any of the components associated with the localization function exceeding error thresholds associated with each of the components.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
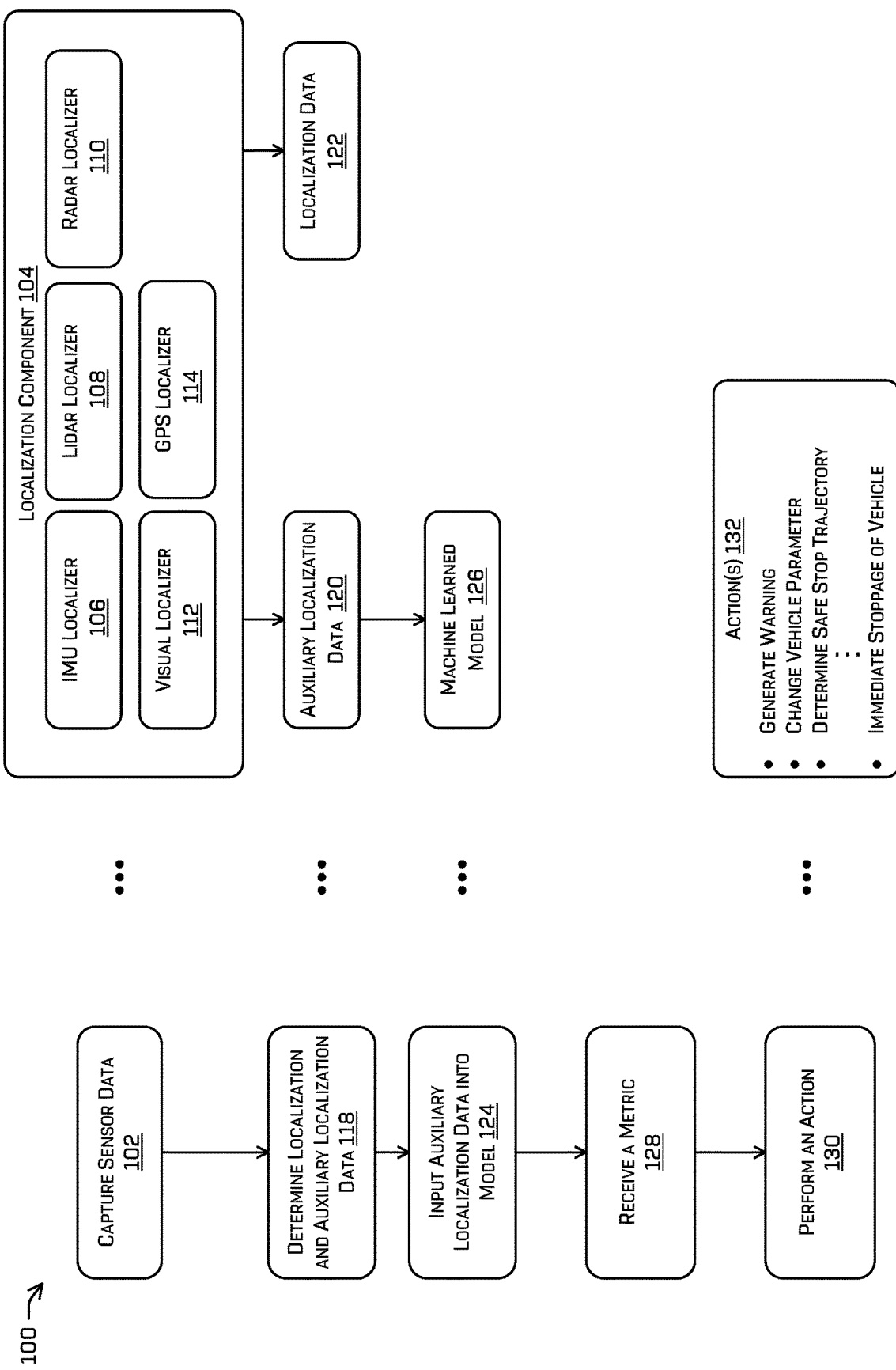
FIG. 1 illustrates a pictorial flow diagram of an example process of determining a localization performance metric, as described herein.

Techniques described herein relate to determining a localization performance metric associated with an entity, such as a vehicle. A vehicle computing system of a vehicle may determine a current localization state of the vehicle. The localization state (also referred to as localization data) of the vehicle may include one or more of a location, orientation, velocity, acceleration, or the like. In some examples, the localization data may include a state of a system associated with localizing the vehicle within an environment (e.g., a wheel speed, wheel orientation, etc.). In some examples, the localization data may be a location and/or position of the vehicle in the environment. In some examples, the localization data may be determined by inputting sensor data captured by one or more sensors into a localization component of the vehicle. In some examples, the localization component may also generate, in addition to the localization data of the vehicle, auxiliary localization data. In some examples, a localization performance metric may be determined by inputting the auxiliary localization data into a machine learned model. The vehicle computing system may control the vehicle based on the localization performance metric.

The vehicle may be an autonomous or semi-autonomous vehicle that utilizes sensor data collected by one or more sensors to navigate through an environment. The sensor data captured by the vehicle may include data captured by different sensor modalities such as, but not limited to, lidar sensors, camera sensors, radar sensors, time-of-flight sensors, sonar sensors, inertial measurement units (IMU), and the like. In some examples, the vehicle computing system may additionally navigate through the environment based on map data associated with one or more maps. In some examples, the map(s) may include feature maps (e.g., discrete features associated with the environment), tile maps (e.g., environment represented in discrete regions of data), and the like. In some examples, a localization component may include individual localizers associated with the different sensor modalities (e.g., a lidar localizer, a visual localizer, a radar localizer, an IMU localizer, GPS localizer, and the like) and generate localization data and auxiliary localization data. In some examples, the auxiliary localization data may include variance data, latent parameters, and residual data.

In some examples, thresholds may be assigned to parameters within the auxiliary localization data. For example, each residual within the residual data may have their own threshold, wherein when one or more residuals meet or exceed their respective thresholds (e.g., the IMU residuals meet or exceed the threshold associated specifically with IMU residuals), this may be indicative of a failure or error of the localization component In some examples, the failure or error of the localization component may result in the vehicle being unable to accurately locate itself within an environment. In some examples, there may be a scenario where although an individual threshold was met or exceeded, the localization component may nevertheless be exhibiting system failure or error. In such an example, there may be no indication and/or advanced warning to indicate that the localization component is exhibiting failure or error. To mitigate such a scenario, the auxiliary localization data may be input into a machine learned model to generate a localization performance metric that is indicative of the performance of the localization component. In some examples, the value of the localization performance metric may be indicative of whether the localization component is exhibiting an error and the severity of the error, and is able to indicate this even when no residual has met or exceeded their respective threshold. In some examples, higher value of the localization performance metric is indicative of lower performance of the localization component (e.g., higher inaccuracy in localizing the vehicle within the environment).

In some examples, the localization component of the vehicle may determine the localization data and the auxiliary localization data based at least in part on the one or more of the sensor modalities. For example, a lidar localizer may receive lidar sensor data from one or more lidar systems and/or one or more maps associated with an environment. The lidar localizer may process the lidar sensor data and the map(s) to determine a portion of a state of the vehicle. For another example, a visual localizer may receive image sensor data from one or more cameras and one or more maps and may process the image sensor data and the map(s) to determine a second portion of the state of the vehicle. For yet another example, an IMU localizer may receive IMU sensor data from one or more IMUs and/or one or more odometry sensors (e.g., wheel speed sensors, motor speed sensors, steering angle sensors, etc.) and may determine a third portion of the state of the vehicle based on the IMU sensor data.

In some examples, a localization component may determine the localization data and the auxiliary localization data based on the first, second, and third portion of the state information received from one or more of the individual localizers. It is contemplated that the localization component may receive additional portions of the state information to determine the localization data and the auxiliary localization data. The localization component may include a component configured to determine the localization data such as a location, orientation, velocity, and/or acceleration of the vehicle, such as that described in U.S. Pat. No. 11,345,360, issued May 31, 2022 and entitled "Localization Error Handling," the entire contents of which are incorporated herein by reference for all purposes. In some examples, the localization component may output the localization data to a localization error monitoring component to determine the residual data, such as that described in U.S. Pat. No. 11,254,323, issued Feb. 22, 2022 and entitled "Localization Error Monitoring," the entire content of which are incorporated herein by reference for all purposes.

In some examples, the localization data may be continuously saved in log data of the vehicle in sliding windows of time (e.g., in 5 second sliding windows). In some examples, the localization component may be configured to fuse the localization data from each sliding window of time to determine a total localization data. In some examples, the total localization data may be more accurate than the localization data. Similarly, the localization component may be configured to fuse the auxiliary localization data to determine a total auxiliary localization data. In some examples, the total localization data and the total auxiliary localization data may be a greater relative accuracy than the localization data and the auxiliary localization data.

In some examples, the localization component may determine the auxiliary localization information. In some examples, the auxiliary localization information may include variance data, latent parameters, and/or residual data. In some examples, the auxiliary localization data may be input into a machine learned model to determine a localization performance metric indicative of whether the localization component is operating as expected or exhibiting a failure or error. The performance metric may be provided to a planner component of the vehicle. The planner component may thus determine, based on the localization performance metric, an action for the vehicle to take, such as generating and logging an alert or warning, slow down, stop operation of the vehicle, and the like. Accordingly, the techniques described herein enable the vehicle to ensure highly accurate location information by monitoring the metrics and/or enable quick and accurate error identification in a localization component based on the localization performance metrics.

In some examples, the auxiliary localization information may include in the variance data, a confidence determined by the respective individual localizer that the localization data is accurate. In some examples, the variances may be determined by propagating the expected uncertainty from the sensor data to estimates using a linearized system. In some examples, the localization component may determine a covariance for each individual localizer. In such examples, the localization component may monitor variances across two or more dimensions. For example, the covariance may include a variance across longitudinal and lateral dimensions (e.g., X/Y). For another example, the covariance may include a variance across a pitch, roll, and yaw of the vehicle.

In some examples, the auxiliary localization information may include in the residual data, one or more residuals associated with measurements corresponding to each individual localizer. In some examples, the residual data may represent a difference between two or more measurements or values. In some examples, the residual data may represent a difference between measurements from two or more sensors associated with the same localizer (e.g., a wheel speed associated with a first wheel and a wheel speed associated with a second wheel). In some examples, the residual data may represent a difference between measurement associated with two or more individual localizers. In some examples, the residual data may represent a difference between multiple measurements from the same sensors. In some examples, the residual data may represent a difference between an observed value (e.g., based on sensor data) and an estimated or expected value (e.g., estimated or expected pitch, roll, yaw, location, velocity, or the like). In some examples, the difference between an observed value and an estimated or expected value may represent a difference between a measured location/orientation of the vehicle determined by sensor data and an estimated or expected location/orientation of the vehicle. In some examples, the estimated value may be based in part on a value associated with a previous time step (e.g., value associated with a measurement taken 0.1 second prior to the current measurement). In such examples, the residuals may represent inconsistencies in the measurements. For example, a residual may include a difference between an observed velocity at a time and a velocity at a previous time step. Based on determining the difference, the localization component may determine that a system associated with the velocity measurement may be associated with an error. In some examples, the residual data may be normalized by the variance data (e.g., modified to a same scale as the variance data) or by a standard deviation. In such an example, this normalization may result in a whitened residual data and the residual data prior to the normalization is referred to as unwhitened residual data. In some examples, the auxiliary localization data may include both whitened and unwhitened residual data. In some examples, the residual data may include residuals across multiple degrees of freedom. In some examples, the residual data may comprise a difference between a localization based on a first set of sensor data (which may be received from less than all the sensors) and a localization based on a second set of sensor data (which may be received from all of the sensors).

In some examples, each residual within the residual data may be associated with a threshold. In some examples, while the residuals may be under their respective threshold, the localization component may nevertheless be exhibiting system failure. In such examples, techniques described herein relate to using residuals (and the auxiliary localization data in general) generated from sensor data from one or more sensors associated with the one or more localizers and/or vehicle systems to determine a localization performance metric (e.g., a single number) that may inform of localization component error and/or failure despite no residuals meeting or exceeding their respective thresholds. In some examples, the performance metric may be based on residuals from a single localizer. In some examples, the performance metric may be based on residuals from a plurality or all localizers.

In some examples, the localization performance metric may be generated by inputting the auxiliary localization data into a machine learned model. In some examples, the auxiliary localization data may include multiple degrees of freedom (e.g., 3 degrees of freedom, 6 degrees of freedom). In some examples, the machine learned model may be configured to assign weights (e.g., 1.2, 1.5, etc.) to the different degrees of freedom. In some examples, the vehicle state may be associated with six degrees of freedom (e.g. three in translational and three in rotational). In some examples, the weights may represent an importance of the degree of freedom to the control of the vehicle. In some examples, the weights may represent a confidence in a particular degree of freedom of the plurality degrees of freedom. In some examples, the weights may be determined based on testing, experimental data, empirical analysis, machine learning, heuristics, driving performance, and the like. As a non-limiting example, localization in a lateral direction may be assigned a higher weight than a height of the vehicle. In some examples, the machine learned model may determine the localization performance metric by applying each of the weights associated with each degrees of freedom to the auxiliary localization data associated with each degrees of freedom and combining the weighted auxiliary localization data to output a weighted sum.

In some examples, the machine learned model may be trained to generate the localization performance metric. In some examples, the machine learned model may be trained using ground truth data and training data. In some examples, both the ground truth data and the training data may utilize log data associated with one or more previous trips made by the vehicle. In some examples, the ground truth data and the training data may utilize log data associated with one or more different vehicle.

In some examples, the ground truth data may include total auxiliary localization data associated with one or more previous trips made by the vehicle and/or associated with the different vehicle. In some examples, the ground truth data may include total auxiliary localization data from multiple trips and multiple vehicles. In some examples, the training data may include auxiliary localization data from the one or more previous trips made by the vehicle or from the one or more different vehicles. In some examples, the machine learned model may be trained to determine the one or more error values based on a difference between the ground truth data and the training data. In some examples, when determining the difference between the ground truth data and the training data, the difference is determined based on the ground truth data and the training data associated with a same time window, a same previous trip, a same vehicle, and a same log data.

Alternatively, in some examples, the auxiliary localization data associated with multiple previous trips and/or multiple vehicles may be utilized as the ground truth data. In some examples, synthetic error may be introduced to the auxiliary localization data associated with multiple previous trips and/or multiple vehicles to generate the training data. In some examples, synthetic error may be introduced to the sensor data to generate the training data. In some examples, when generating the training data, the synthetic error lowers the accuracy of the data compared to the ground truth data.

In some examples, the performance metric may be indicative of error or failure within the localization component and the severity of the error or failure. In some examples, the performance metric, by way of indicating error or failure and its associated severity, may be used to determine an action for controlling the vehicle. For example, the performance metric may be used to determine whether to generate an alarm or warning indicative of error in the vehicle state, whether to generate a safe stop trajectory for the vehicle to safely stop, or whether the vehicle needs to be stopped immediately. In at least some examples, such an indication may additionally or alternatively be sent to a remote or teleoperator with a portion of data about the vehicle (e.g., sensor data, derivative data from such sensor data, state data, historical data, etc.) such that a remote operator may monitor the vehicle. For yet another example, the performance metric may be used to adjust a parameter of the vehicle (e.g., bounding box size associated with the vehicle for modeling error or predicting interactions between the vehicle and objects in the environment, maximum speed, etc.). In some examples, the performance metric may be used to determine whether the vehicle is due for maintenance, and the vehicle may generate a trajectory to a maintenance facility as a response to the performance metric.

In some examples, the performance metric may be associated with one or more thresholds. In some examples, the one or more thresholds may be determined using the ground truth and the error. In some examples, the one or more thresholds may be determined based on testing, experimental data, empirical analysis, machine learning, heuristics, driving performance of the vehicle, and the like. In some examples, the one or more thresholds may be associated with one or more of the above-described actions. In some examples, the performance metric may be associated with a plurality of thresholds, wherein each threshold of the plurality of thresholds may be indicative of increasing severity of the error associated with the vehicle state. In response to the increasing severity, the vehicle may be controlled to take increasingly critical action. For example, a first threshold may be indicative of a low severity error, a second threshold may be indicative of a medium severity error, and a third threshold may be indicative of a high severity error. In response to the performance metric meeting or exceeding the first threshold but less than the second threshold, a planner component of the vehicle may lower the vehicle's maximum speed limit as it traverses the environment or generate an alarm or warning indicating an error in the vehicle state. In response to the performance metric meeting or exceeding the second threshold but less than the third threshold, the planner component of the vehicle may generate a safe stop trajectory for the vehicle to safely stop. In response to the performance metric meeting or exceeding the third threshold, the planner component of the vehicle may direct the vehicle to an immediate or emergency stop.

In some examples, the performance metric may be associated with map data. For example, the performance metric may be associated with map data to determine whether the vehicle's localization component has a habit of exhibiting an error at a particular location. In some examples, the performance metric may be associated with one or more environmental considerations (e.g., road conditions, time of day, level of darkness (e.g., light level), etc.) and/or weather considerations (e.g., temperature, precipitation, fog, etc.). For example, performance metric may be used to determine that the localization component has a habit of exhibiting the error during heavy fog.

Techniques described herein provide various technical and/or operational benefits to vehicles, such as autonomous vehicles or other robotic platforms. For example, by utilizing the performance metric that involves multiple or all localizers, techniques described herein offer a more sophisticated "check" on localization than is present with current techniques. That is, the performance metric provides context associated with localization and identified errors to the planner component that is not used in current techniques. The context provided to the planner component may enable the planner component to determine whether it needs to disengage systems (e.g., localizers, sensors, etc.) associated with a vehicle and/or cause the vehicle to slow down or stop operation (e.g., pull over to the side of a highway or a congested area). That is, by leveraging the context made available by accessing the performance metric, the planner component is able to continue controlling the vehicle (e.g., driving autonomously) even though the localization errors are not yet resolved (e.g., metrics include acceptable values).

In addition to providing a more sophisticated "check," techniques described herein enable the planner component to handle errors in localization more safely. That is, by leveraging context made available by the performance metric, this enables the vehicle to continue driving instead of pulling over to the side of a highway or congested area, for example, techniques described herein enable autonomous vehicles to drive within an environment more safely.

Techniques described herein can be implemented in a number of ways. Example implementations are provided below with reference to the following figures. Example implementations are discussed in the context of autonomous vehicles; however, the methods, apparatuses, and systems described herein can be applied to a variety of systems (e.g., a sensor system or a robotic platform), and are not limited to autonomous vehicles. Additionally, the techniques described herein can be used with real data (e.g., captured using sensor(s)), simulated data (e.g., generated by a simulator), or any combination of the two.

FIG. 1 illustrates a pictorial flow diagram of an example process 100 for determining a localization performance metric, in accordance with examples of this disclosure. In some examples, the localization performance metric maybe determined in association with an operation of a vehicle, such as an autonomous vehicle, semi-autonomous vehicle, or manually controlled vehicle.

In some example, the vehicle may include an autonomous vehicle configured to operate (e.g., drive) within an environment. An autonomous vehicle can be configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since an autonomous vehicle may be configured to control all functions from start to stop, including all parking functions, it may be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled.

At operation 102, the vehicle may capture or receive sensor data from one or more sensors associated with the vehicle. Examples of the one or more sensors may include, but are not limited to, lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, lateral velocity sensor (e.g., sensor that determines lateral speed based on ground tracking), etc.), cameras (e.g., red, green blue (RGB), infrared (IR), intensity, depth, etc.), wheel encoders, environment sensors (e.g., temperature sensors, humidity sensors, light sensors, pressure sensors, etc.), time-of-flight (ToF) sensors, odometry sensors (e.g., wheel speed sensors, motor speed sensors, steering angle sensors, and the like). In some examples, the vehicle may include a localization component such as localization component 104. The localization component 104 may include functionality to receive the sensor data from the one or more sensors to determine a state of the vehicle associated with the localization of the vehicle within the environment (e.g., (e.g., one or more of an x-, y-, z-position, x-, y-, z-velocities and/or accelerations, roll, pitch, or yaw, roll, pitch, or yaw velocities and/or accelerations, etc.). In some examples, the state of the vehicle may be represented by degrees of freedom. In some examples, the localization component 104 may include and/or request and/or receive map data and may continuously determine the state of the vehicle (e.g., a location and/or orientation) of the vehicle within the map data.

In some examples, the localization component 104 may include, but are not limited to, individual localizers such as IMU localizer 106, lidar localizer 108, radar localizer 110, visual localizer 112 (e.g., cameras (e.g., red, green, blue (RGB), infrared (IR), intensity, depth, or the like), GPS localizer 114 (e.g., Global Positioning System), and the like. In some examples each of the individual localizers 106, 108, 110, and 112 may process sensor data from at least the one or more sensors to determine at least a portion of the state of the vehicle. For example, the IMU localizer 106 may receive IMU data from one or more of the inertial sensors and odometry data from one or more of odometry data and may determine an orientation of the vehicle as a portion of the state based on the sensor data associated with the inertial sensor(s) and odometry sensor(s). For another example, the lidar localizer 108 may receive sensor data from one or more lidar sensors and may output an estimated location of the vehicle as a portion of the state of the vehicle based on the sensor data associated with the lidar sensor(s).

At operation 118, the localization component 104 may determine localization data and auxiliary localization data. In the context of FIG. 1, the localization data may be localization data 122 and the auxiliary localization data may be auxiliary localization data 120.

In some examples, the localization component 104 may be configured to combine (e.g., fuse) each of the portion of the state of the vehicle to determine the localization data 122 (also referred to as total state, state, or global state, etc.). In some examples, the localization component 104 may fuse the portion of the state of the vehicle into the localization data 122 by utilizing SLAM (simultaneous localization and mapping), CLAMS (calibration, localization and mapping, simultaneously), relative SLAM, bundle adjustment, non-linear least squares optimization, Bayesian filters (such as Kalman filters) or the like to receive respective data associated with each portion of the state of the vehicle (e.g., image data, lidar data, radar data, IMU data, GPS data, wheel encoder data, etc.) to accurately determine the localization data 122. In some examples, the localization data 122 may include, but are not limited to, a current location, position, orientation, velocity, and acceleration associated with the vehicle. In some examples, the localization data 122 may be continuously saved in log data of the vehicle in sliding windows of time (e.g., in 5 second sliding windows). In some examples, the localization component 104 may be configured to fuse the localization data 122 from each sliding window of time to determine a total localization data. In some examples, the total localization data may be more accurate than the localization data 122.

In some examples, in addition to determining the localization data 122, the localization component 104 may also determine the auxiliary localization data 120. In some examples, similar to the localization data 122, the auxiliary localization data 120 may be continuously saved in the log data in sliding windows of time (e.g., in 5 second sliding windows). In some examples, the localization component 104 may also be configured to fuse the auxiliary localization data 120 from each sliding window of time to determine a total auxiliary localization data. In some examples, the total auxiliary localization data may be more accurate than the auxiliary localization data 120. In some examples, the increased accuracy may be reflected in the total auxiliary localization data having lower values across all associated degrees of freedoms than the auxiliary localization data 120.

Examples of the auxiliary localization data 120 may be, but are not limited to, variances data, latent parameters, and residual data. In some examples, the auxiliary localization data 120 may be associated with a plurality of degrees of freedom. For example, the auxiliary localization data 120 may include a IMU residuals associated with both translational and rotational degrees of freedom (e.g., 6 degrees of freedom, 3 across translational and 3 across rotational). Examples of latent parameters may be, but are not limited to, IMU biases, wheel scales, map twist, and the like. In some examples, variance data may include one or more of variance values and/or covariance values associated with an estimated state of the vehicle. In some examples, the variance data may include a variance or covariance across multiple degrees of freedom (e.g., across pitch, roll, and yaw of the vehicle).

In some examples, the residual data may represent a difference between two or more measurements or values. In some examples, the residual data may represent a difference between measurements from two or more sensors associated with the same localizer (e.g., a wheel speed associated with a first wheel and a wheel speed associated with a second wheel). In some examples, the residual data may represent a difference between measurement associated with two or more individual localizers. In some examples, the residual data may represent a difference between an observed value (e.g., based on sensor data) and an estimated or expected value (e.g., estimated or expected pitch, roll, yaw, location, velocity, or the like). In some examples, the residual data may be normalized by the variance data (e.g., modified to a same scale as the variance data) or by a standard deviation. In such an example, this normalization may result in a whitened residual data and the residual data prior to the normalization is referred to as unwhitened residual data. In some examples, the auxiliary localization data 120 may include both whitened and unwhitened residual data. In some examples, the residual data may include residuals across multiple degrees of freedom.

At operation 124, the auxiliary localization data 120 may be input into a machine learned model 126 to determine a localization performance metric. In some examples, the machine learned model 126 may use machine learning techniques (e.g., using a perceptron, deep learning techniques (including recurrent neural networks, such as long short-term memory (LSTM), regressions, classifications, or any other method for deriving a relationship between data and one or more labels, values, etc.). In some examples, the machine learned model 126 may be located on the vehicle. In some examples, the machine learned model 126 may be located on a remote computing device or system. In some examples, the machine learned model 126 may be trained on the remote computing device or system and transmitted to the vehicle for use in determining the localization performance metric during vehicle operation. In some examples, the localization performance metric may be indicative of an error and/or a severity of the error associated with the localization component 104, and therefore, an error in a localization of the vehicle within an environment. In some examples, the higher a value of the localization performance metric, the more severe the error. In other words, the higher the value of the localization performance metric, the lower a performance and/or an accuracy of the localization component 104.

In some examples, machine learned model 126 may be configured to assign weights (e.g., 0.5, 1.2, 1.5, etc.) to the auxiliary localization data 120 associated with each degree of freedom of the plurality of degrees of freedom. For example, a first weight may be applied to a first auxiliary localization data associated with pitch to determine a first weighted auxiliary localization and a second weight may be applied to a second auxiliary localization data associated with yaw to determine a second weighted auxiliary localization. In some examples, the weight may represent the importance of the particular degree of freedom to the performance of the localization component 104. In some examples, the weights may represent a confidence in a particular degree of freedom of the plurality degrees of freedom. In some examples, the weights may be determined based on testing, experimental data, empirical analysis, machine learning, heuristics, driving performance, and the like. In some examples, the machine learned model may determine the performance metric as a weighted sum from combining the weighted auxiliary localization data associated with each degree of freedom. For example, the localization performance metric may be determined as the sum of the first weighted auxiliary localization and the second weighted auxiliary localization.

In some examples, the machine learned model 126 may be trained to determine one or more errors associated with the auxiliary localization data 120. In some examples, the one or more error values may be associated with the plurality of degrees of freedoms. For example, the machine learned model 126 may be trained to determine an error value per translational degrees of freedom and per rotational degrees of freedom (e.g., a first error value associated with surge, a second error value associated with sway, a third error value associated with heave, a fourth error value associated with pitch, a fifth error value associated with roll, and a sixth error value associated with yaw). In some examples, the machine learned model 126 may be trained on a remote computing device and the trained machine learned model 126 may be sent from the remote computing device to the vehicle. In some examples, the machine learned model 126 may be trained on the vehicle itself. In some examples, the machine learned model 126 may be trained using ground truth data and training data. In some examples, both the ground truth data and the training data may utilize log data associated with one or more previous trips made by the vehicle. In some examples, the ground truth data and the training data may utilize log data associated with one or more different vehicle(s).

In some examples, the ground truth data may include total auxiliary localization data associated with one or more previous trips made by the vehicle and/or associated with the different vehicle. In some examples, the ground truth data may include total auxiliary localization data from multiple trips and multiple vehicles. In some examples, the training data may include auxiliary localization data from the one or more previous trips made by the vehicle or from the one or more different vehicles that are similar in content and format to the auxiliary localization data 120. In some examples, the machine learned model 126 may be trained to determine the one or more error value based on a difference between the ground truth data and the training data. In some examples, when determining the difference between the ground truth data and the training data, the difference is determined based on the ground truth data and the training data associated with a same time window, a same previous trip, a same vehicle, and a same log data.

Alternatively, in some examples, the auxiliary localization data associated with multiple previous trips and/or multiple vehicles may be utilized as the ground truth data. In some examples, synthetic error may be introduced to the auxiliary localization data associated with multiple previous trips and/or multiple vehicles to generate the training data. In some examples, synthetic error may be introduced to the sensor data to generate the training data. In some examples, when generating the training data, the synthetic error lowers the accuracy of the data compared to the ground truth data.

At operation 128, the vehicle may receive the performance metric from the machine learned model 126. In some examples, the performance metric may be indicative that localization component 104 may be exhibiting a failure or an error and may further be indicative of the severity of the failure or error. Based on the performance metric, at operation 130, a planner component of the vehicle may direct the vehicle to perform an action. In some examples, the action performed may be reflective of the existence and the severity of the failure or error of the localization component 104 as indicated by the performance metric. Examples of the action are illustrated as action(s) 132 may include, but are not limited to, generating an alert or warning, changing a vehicle parameter (e.g., adjusting a braking force of the vehicle, adjusting a braking distance of the vehicle, adjusting a maximum speed of the vehicle, disassociating a particular sensor or localizer from the vehicle due to error in the sensor or localizer, or the like), determining a safe stop trajectory for the vehicle to safely stop, an immediate or emergency stop of the vehicle, or the like. In some examples, particularly if the vehicle is an autonomous vehicle, the planner component of the vehicle may log the alert or warning within its log data and/or transmit the alert or the warning to a teleoperator. In some examples, the teleoperator can instruct the vehicle to take an additional action based on the alert or the warning.

In some examples, the performance metric may be associated with one or more thresholds. In some examples, the one or more thresholds may be determined based on testing, experimental data, empirical analysis, machine learning, heuristics, driving performance of the vehicle, and the like. In some examples, determining the one or more thresholds using machine learning may include training the machine learned model 126 to determine the one or more thresholds. In some examples, the one or more thresholds may be associated with one or more of the above-described actions. In some examples, the performance metric may be associated with a plurality of thresholds, wherein each threshold of the plurality of thresholds may be indicative of increasing severity of the error associated with the localization component 104. In response to the increasing severity, the planner component of the vehicle may direct the vehicle to take increasingly critical action. For example, a first threshold may be indicative of a low severity error, a second threshold may be indicative of a medium severity error, and a third threshold may be indicative of a high severity error. In response to the performance metric meeting or exceeding the first threshold but less than the second threshold, a planner component of the vehicle may lower the vehicle's maximum speed limit as it traverses the environment or generate an alarm or warning indicating an error in the vehicle state, wherein the alarm or the warning may be transmitted to a teleoperator and/or logged within the vehicle's log data without further action. In response to the performance metric meeting or exceeding the second threshold but less than the third threshold, the planner component of the vehicle may generate a safe stop trajectory for the vehicle to safely stop. In response to the performance metric meeting or exceeding the third threshold, the planner component of the vehicle may direct the vehicle to an immediate or emergency stop.

In some examples, the performance metric may also be indicative of the vehicle needing maintenance. In response the planner component of the vehicle may generate a trajectory to the closest maintenance center. In some examples, the performance metric may further be associated with map data. For example, the performance metric may be associated with map data to determine whether the vehicle state habitually exhibits the error at a particular location. In some examples, the performance metric may be associated with one or more environmental considerations (e.g., road conditions, time of day, level of darkness (e.g., light level), etc.) and/or weather considerations (e.g., temperature, precipitation, fog, etc.). For example, performance metric may be used to determine that the vehicle state habitually exhibits the error during heavy fog.

Figure 2:
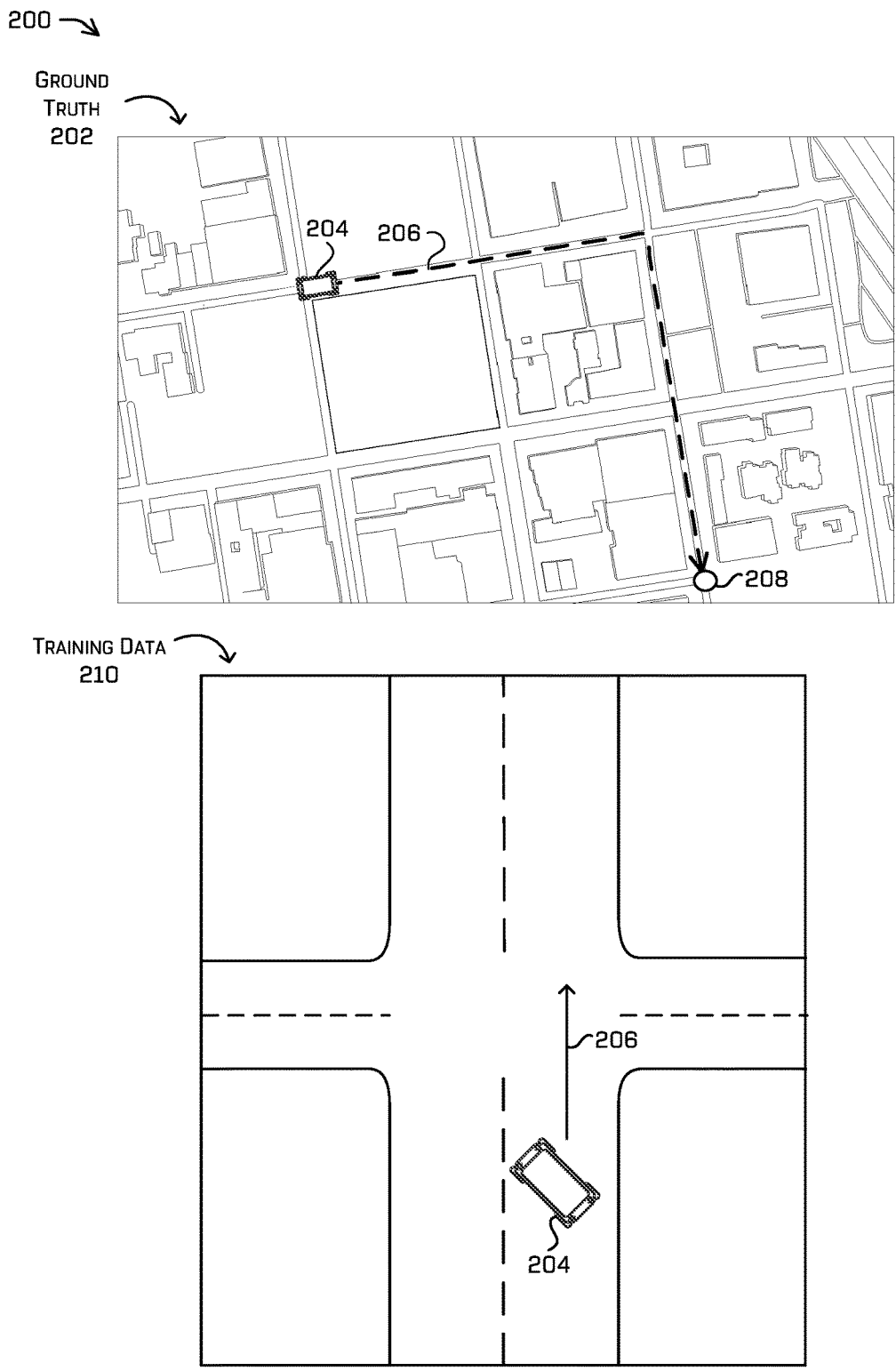
FIG. 2 illustrates example driving scenarios illustrative of ground truth data and training data used to train a machine learned model, as described herein.

FIG. 2 illustrates an illustration 200 of example driving scenarios 202 and 210 illustrative of ground truth data and training data used to train a machine learned model such as the machine learned model 126, as described herein. Scenario 202 illustrates a pictorial representation of the ground truth data, as described herein. Scenario 210 illustrates a pictorial representation of training data, as described herein.

Scenario 202 illustrates a vehicle 204 traversing an environment along a trajectory 206 to a destination 208. In some examples, the scenario 202 may be illustrative of total localization data and total auxiliary localization data captured in log data of the vehicle 204. In some examples, the vehicle 204 may be the same vehicle as the vehicle described in association with FIG. 1. In such an example, scenario 202 may be illustrative of a previous trip taken by the vehicle described in association with FIG. 1. In some examples, the vehicle 204 may be a different vehicle from the vehicle described in association with FIG. 1. In the context of training the machine learned model 126, as described above in association with FIG. 1, only the total auxiliary localization data is utilized as the ground truth data.

In some examples, scenario 210 illustrates the vehicle 204 traversing the environment during a particular window of time. In some examples, scenario 210 may be a pictorial representation of the localization data and auxiliary localization data associated with the trip illustrated in scenario 202. In some examples, the localization data and the auxiliary localization data may contain less accuracy compared to the total localization data and the total auxiliary localization data. As such, in the scenario 210, the vehicle 204 may be oriented in a different direction than its trajectory, illustrating the lower accuracy of the localization data and the auxiliary localization data, while in the scenario 202, the vehicle 204 is oriented in the same direction as its trajectory, illustrating the higher accuracy of the total localization data and the total auxiliary localization data. In the context of training the machine learned model 126, as described above in association with FIG. 1, only the total auxiliary localization data is utilized as the training data. In the context of accuracy, because the training data has lower accuracy, the training data would have higher values with respect to the variance data, the latent parameters, and the residual data relative to the values with respect to the variance data, the latent parameters, and the residual data associated with the ground truth data.

As discussed herein, the machine learned model 126 can be trained in a variety of ways. In a first example, a vehicle can traverse through an environment capturing sensor data and generating localization data and auxiliary localization data (e.g., using a localization component generating localization data and auxiliary data over a relatively short sliding window of time). Later, vehicle log data can be analyzed for an entire run (or a relatively longer period of time) to generate ground truth localization data and ground truth auxiliary localization data (e.g., using more complex and/or resource intensive algorithms than available on the vehicle). A ground truth performance metric can be generated based on the ground truth localization data and the ground truth auxiliary localization data. An example of such a ground truth performance metric is provided in the equation below:

$$\text{Performance Metric} = tx_{error} \times w_{tx} + ty_{error} \times w_{ty} + tz_{error} \times w_{tz} + rx_{error} \times w_{rx} + ry_{error} \times w_{ry} + rz_{error} \times w_{zx}$$

Where $tx_{error}$ is a translational error in the x direction (between the ground truth localization data/ground truth auxiliary localization data and the localization/auxiliary localization data generated on-vehicle), $w_{tx}$ is a weight associated with the translational error in the x direction. $ty_{error}$ and $tz_{error}$ are respective errors in the y and z direction, and $w_{ty}$ and $w_{tz}$ are respective weights. Further, $rx_{error}$ is a rotational error or a difference in the ground truth localization/ground truth auxiliary localization data in the x direction and the localization/auxiliary localization data generated on-vehicle, while $w_{rx}$ can represent a weight associated with that term. Further, $ry_{error}$ and $rz_{error}$ are respective errors in the rotational y and z direction, and $w_{ry}$ and $w_{zx}$ are respective weights. Of course, any number of errors is contemplated.

Of course, different performance metrics can be generated in addition to the example provided above. Further, more terms can be added or removed from the example equation to consider more or less data for training a machine learning model.

In a second example, localization data and auxiliary localization data generated on-vehicle can be considered as "ground truth data," and errors can be injected into the ground truth data to determine training data. For example, a position and/or orientation of the vehicle can be modified to introduce errors into the training data. Alternatively, errors can be injected into sensor data from one or more sensors of vehicle 204 to determine the training data. The performance metric can be generated similar to the equation above and the machine learned model 126 can be trained to output a performance metric. That is, the machine learned model 126 can be trained to predict a performance metric and the difference between the predicted performance metric and a ground truth performance metric can be used to change the weights of a machine learning model to generate a trained machine learned model. Once the machine learned model is trained it can be output to a vehicle to determine a localization performance metric as discussed herein.

Figure 3:
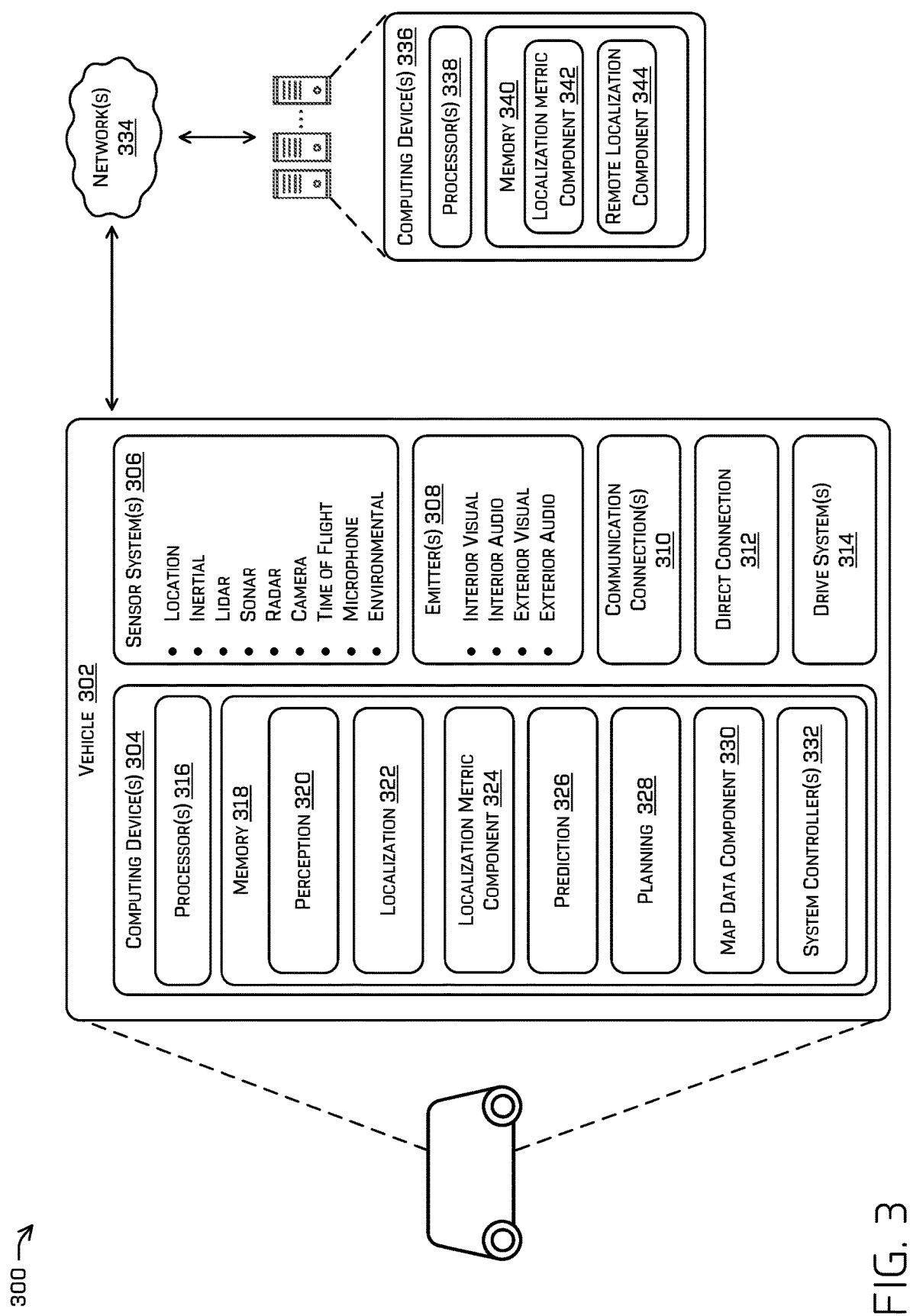
FIG. 3 is a block diagram of an example architecture of a vehicle control system and a computing system for determining the localization performance metric, as described herein.

FIG. 3 illustrates an example computing environment 300 that may be used to implement a localization performance metric, according to the techniques described herein. The computing environment 300 may include a computing device 336 and a vehicle control system 302. In some examples, the localization metric component 324 may comprise a machine learned model used to determine the localization performance metric as described in FIG. 1 and throughout this disclosure. In some examples, the computing device 336 may be used to determine the localization performance metric. The components of computing device 336 may be implemented within a single computing system, as in this example, or may be implemented in separate computer systems.

The vehicle control system 302 may include various software-based and/or hardware-based components of an autonomous vehicle, and may be used to control autonomous vehicles traversing through physical environments and/or simulated vehicles operating within virtual and/or log-based driving simulations.

In this example, the vehicle control system 302 and the computing device 336 are illustrated as discrete computing systems communicating over one or more networks 334, although in other implementations the functionality of each of the systems 302, 336, may be carried out in the same computing environment. By way of non-limiting example, software executing the functionality of the vehicle control system 302 may be uploaded or otherwise incorporated into the computing device 336 and/or software executing the computing device 336 may be uploaded to or otherwise made incorporated into the vehicle control system 302.

The vehicle control system 302 can be a hardware-based and/or software-based controller for a driverless vehicle, such as an autonomous vehicle. In some instances, the vehicle control system 302 may operate within a real vehicle, such as a fully or partially autonomous vehicle. In some instances, the techniques described herein may be usable by non-autonomous vehicles as well. Additionally or alternatively, the vehicle control system 302 may operate independently from any vehicle, for example, as a hardware and software-based controller for a simulated vehicle executing in a computing environment during the development, testing, and validation processes for the vehicle control system 302. In addition, while implementations of the vehicle control system 302 described herein may include simulating a control system of an autonomous vehicle, semi-autonomous vehicle, or a non-autonomous vehicle, some of the techniques may be in a simulated environment, using a simulated vehicle.

The vehicle control system 302 can be used for any configuration of real or simulated vehicles, such as, for example, a van, a sport utility vehicle, a cross-over vehicle, a truck, a bus, an agricultural vehicle, and/or a construction vehicle. For instance, the associated vehicle for the vehicle control system 302 can be powered by one or more internal combustion engines, one or more electric motors, hydrogen power, any combination thereof, and/or any other suitable power sources. Although the associated vehicle may have four wheels, the vehicle control system 302 and associated techniques described herein can be incorporated into vehicles having fewer or a greater number of wheels, and/or tires. The vehicle control system 302 can control vehicles having four-wheel steering and can operate generally with equal or similar performance characteristics in all directions, for example, such that a first end of the vehicle is the front end of the vehicle when traveling in a first direction, and such that the first end becomes the rear end of the vehicle when traveling in the opposite direction. Similarly, a second end of the vehicle is the front end of the vehicle when traveling in the second direction, and such that the second end becomes the rear end of the vehicle when traveling in the opposite direction. These example characteristics May facilitate greater maneuverability, for example, in small spaces or crowded environments, such as parking lots and/or urban areas.

The vehicle control system 302 can include a computing device(s) 304, one or more sensor system(s) 306, one or more emitter(s) 308, one or more communication connection(s) 310 (also referred to as communication devices and/or modems), at least one direct connection 312 (e.g., for physically coupling with the vehicle to exchange data and/or to provide power), and one or more drive system(s) 314. The one or more sensor system(s) 306 can be configured to capture sensor data associated with an environment.

The sensor system(s) 306 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 306 can include multiple instances of each of these or other types of sensors. For instance, the time-of-flight sensors can include individual time-of-flight sensors located at the corners, front, back, sides, and/or top of the real or simulated vehicle associated with the vehicle control system 302. As another example, the camera sensors can include multiple cameras disposed at various locations about the exterior and/or interior of the associated real or simulated vehicle. The sensor system(s) 306 can provide input to the computing device(s) 304.

The vehicle control system 302 can also include one or more emitter(s) 308 for controller the emitting of light and/or sound via the real or simulated vehicle associated with the vehicle control system 302. The one or more emitter(s) 308 in this example include interior audio and visual emitters to communicate with passengers of the vehicle. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle control system 302 can also include one or more communication connection(s) 310 that enable communication between the vehicle control system 302 and one or more other local or remote computing device(s) (e.g., a remote teleoperations computing device) or remote services. For instance, the communication connection(s) 310 can facilitate communication with other local computing device(s) on the associated real or simulated vehicle, and/or the drive system(s) 314. Also, the communication connection(s) 310 can allow the vehicle to communicate with other nearby computing device(s) (e.g., other nearby vehicles, traffic signals, etc.).

The communications connection(s) 310 can include physical and/or logical interfaces for connecting the computing device(s) 304 to another computing device or one or more external networks 334 (e.g., the Internet). For example, the communications connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 310 may comprise the one or more modems as described in detail above.

In at least one example, the vehicle control system 302 can include one or more drive system(s) 314. In some examples, the real or simulated vehicle associated with the vehicle control system 302 can have a single drive system 314. In at least one example, if the vehicle has multiple drive systems 314, individual drive systems 314 can be positioned on opposite ends of the associated vehicle (e.g., the front and the rear, etc.). In at least one example, the drive system(s) 314 can include one or more sensor system(s) 306 to detect conditions of the drive system(s) 314 and/or the surroundings of the vehicle. By way of example and not limitation, the sensor system(s) 306 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 314. In some cases, the sensor system(s) 306 on the drive system(s) 314 can overlap or supplement corresponding systems of the vehicle control system 302 (e.g., sensor system(s) 306).

The drive system(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller which can receive and preprocess data from the sensor system(s) 306 and to control operation of the various vehicle systems. In some examples, the drive system controller can include one or more processor(s) and memory communicatively coupled with the one or more processor(s). The memory can store one or more modules to perform various functionalities of the drive system(s) 314. Furthermore, the drive system(s) 314 also include one or more communication connection(s) that enable communication by the respective drive system with one or more other local or remote computing device(s).

The computing device(s) 304 within the vehicle control system 302 can include one or more processor(s) 316 and memory 318 communicatively coupled with the one or more processor(s) 316. In the illustrated example, the memory 318 of the computing device(s) 304 stores a perception component 320, a localization component 322, a localization metric component 324, a prediction component 326, a planning component 328, a map data component 330, and one or more system controller(s) 332. Though depicted as residing in the memory 318 for illustrative purposes, it is contemplated that the perception component 320, the localization component 322, the localization metric component 324, the prediction component 326, the planning component 328, the map data component 330, and the one or more system controller(s) 332 can additionally, or alternatively, be accessible to the computing device(s) 304 (e.g., stored in a different component of vehicle control system 302 and/or stored remotely and accessible to the vehicle control system 302.

In memory 318 of the computing device(s) 304, the perception component 320 can include functionality to perform object detection, segmentation, and/or classification. In some examples, the perception component 320 can provide processed sensor data that indicates a presence of an entity that is proximate to the real or simulated vehicle associated with the vehicle control system 302 and/or a classification of the entity as an entity type (e.g., car, pedestrian, cyclist, building, tree, road surface, curb, sidewalk, unknown, etc.). In additional and/or alternative examples, the perception component 320 can provide processed sensor data that indicates one or more characteristics associated with a detected entity and/or the real or simulated environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The perception component 320 can include functionality to store perception data generated by the perception component 320. In some instances, the perception component 320 can determine a track corresponding to an object that has been classified as an object type. For purposes of illustration only, the perception component 320, using sensor system(s) 306 can capture one or more images of a real or simulated environment. The sensor system(s) 306 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 306, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The localization component 322 can include functionality to receive data from the sensor system(s) 306 to determine a position of the real or simulated vehicle associated with the vehicle control system 302. For example, the localization component 322 can include and/or request/receive a three-dimensional map of the real or simulated environment and can continuously determine a location of the autonomous vehicle within the map. In some instances, the localization component 322 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some examples, the localization component 322 may include the localizers as described in FIG. 1 as well as throughout this disclosure. In some instances, the localization component 322 can provide data to various components of the vehicle control system 302 to determine an initial position of an autonomous vehicle for generating a trajectory, as discussed herein.

The localization metric component 324 can include a machine learned model, such as machine learned model 126, configured to input sensor data from sensor system(s) 306 and/or data from the localization component 322 to generate the localization performance metric as described by FIG. 1 as well as throughout this disclosure.

The prediction component 326 can generate one or more probability maps representing prediction probabilities of possible locations of one or more objects in a real or simulated environment. For example, the prediction component 326 can generate one or more probability maps for vehicles, pedestrians, animals, and the like within a threshold distance from the vehicle associated with the vehicle control system 302. In some instances, the prediction component 326 can measure a track of an object and generate a discretized prediction probability map, a heat map, a probability distribution, a discretized probability distribution, and/or a trajectory/trajectories for the object based on observed and predicted behavior. In some instances, the one or more probability maps can represent an intent of the one or more objects in the environment.

The planning component 328 can determine a path for the vehicle control system 302 to direct the real or simulated vehicle through an environment. For example, the planning component 328 can determine various routes and paths and various levels of detail. In some instances, the planning component 328 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 328 can generate an instruction for guiding the autonomous vehicle along at least a portion of the route from the first location to the second location. In at least one example, the planning component 328 can determine how to guide the autonomous vehicle from a first waypoint in the sequence of waypoints to a second waypoint in the sequence of waypoints. In some examples, the instruction can be a path, or a portion of a path, and/or various positions, orientations, velocities, headings, steering angles, accelerations, torques, etc. associated with the one or more waypoints. In some examples, multiple paths can be substantially simultaneously generated (i.e., within technical tolerances) in accordance with a receding horizon technique. A single path of the multiple paths in a receding data horizon having the highest confidence level may be selected to operate the vehicle. The planning component 328 can also determine an action to control the vehicle based on the localization performance metric as described in FIG. 1 as well as throughout this disclosure.

In other examples, the planning component 328 can alternatively, or additionally, use data from the perception component 320 to determine a path for the real or simulated vehicle associated with the vehicle control system 302 to follow to traverse through an environment. For example, the planning component 328 can receive data from the perception component 320 regarding objects associated with an environment. Using this data, the planning component 328 can determine a route to travel from a first location (e.g., a current location) to a second location (e.g., a target location) to avoid objects in an environment. In at least some examples, such a planning component 328 may determine there is no such collision free path and, in turn, provide a path which brings the vehicle to a safe stop avoiding all collisions and/or otherwise mitigating damage.

Computing device 336 may include one or more processors 338 and memory 340 communicatively coupled with the one or more processors 338. In the illustrated example, the memory 340 of the computing device 336 stores a localization metric component 342 and a remote localization component 344. In some examples, the localization metric component 342 may include the machine learned model and may be configured to receive the same data and perform the same function as the localization metric component 324. In some examples, the remote localization component 344 may be configured to generate ground truth data and/or training data as described in FIG. 1, as well as throughout this disclosure. In some examples, the ground truth data and training data generated by the remote localization component 344 may be used to train the machine learned model within the localization metric component 342. Though depicted in FIG. 3 as residing in the memory 340 for illustrative purposes, it is contemplated that some or all of the localization metric component 342 and the remote localization component 344 may additionally, and/or alternatively, be stored remotely and accessible to the computing device 336 through networks 334.

The processor(s) 316 of the computing device(s) 304 and the processor(s) 338 of the computing device 336 can be any suitable processor capable of executing instructions to process data and perform operations as described herein. By way of example and not limitation, the processor(s) 316 and 338 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 318 of the computing device(s) 304, and the memory 340 of the computing device 336 are examples of non-transitory computer-readable media. The memory 318 and 340 can store an operating system and one or more software applications, instructions, programs, and/or data to implement the methods described herein and the functions attributed to the various systems. In various implementations, the memory 318 and 340 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, any or all of the components within the memory 318 and memory 340 can be implemented as a neural network.

Figure 4:
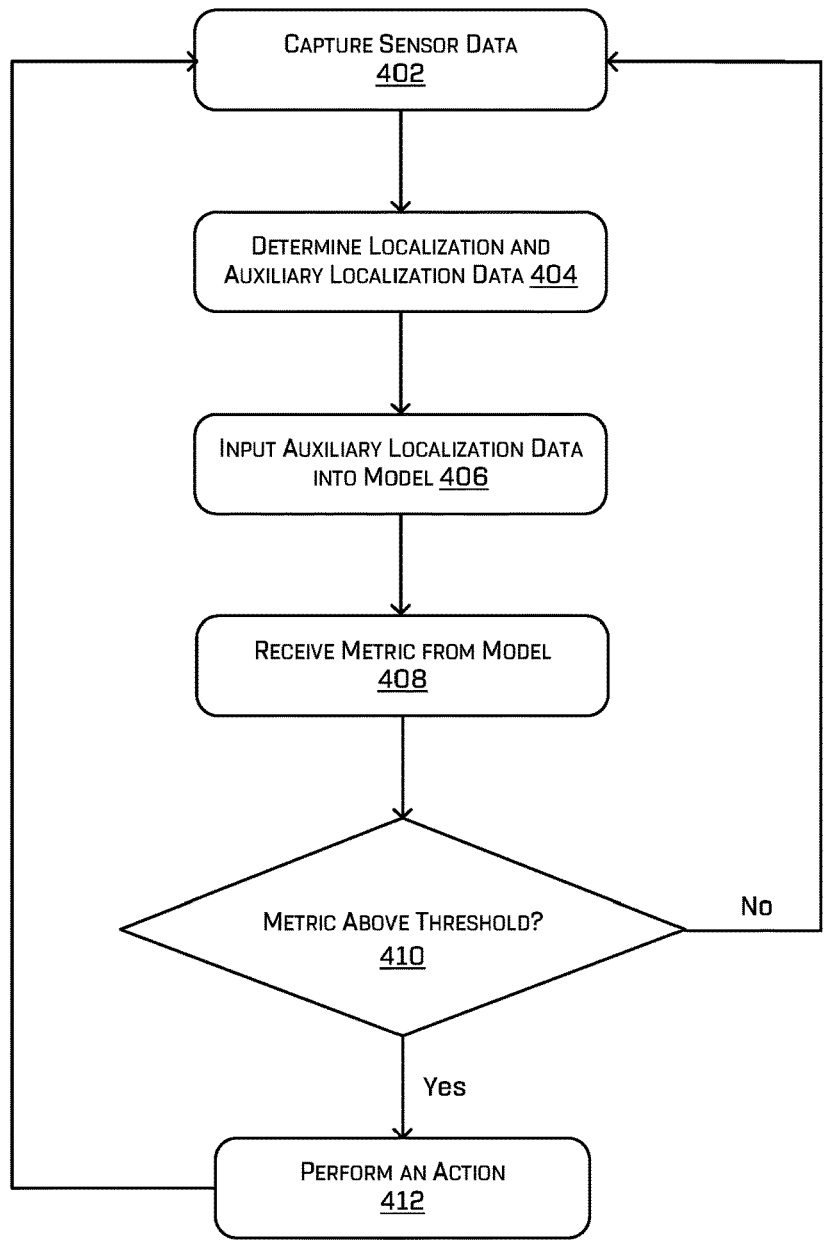
FIG. 4 illustrates an example process for determining a localization performance metric and taking an action based on the metric, as described herein.

FIG. 4 illustrates an example process 400 of a system, such as an autonomous vehicle, determining a localization performance metric and taking an action based on the metric, as described herein.

FIG. 4 illustrates the example process 400 in accordance with examples of the disclosure. This example process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

At operation 402, the autonomous vehicle may capture sensor data using one or more sensors of the autonomous vehicle. Additional details with respect to the autonomous vehicle capturing the sensor data are discussed in connection with FIG. 1, as well as throughout this disclosure.

At operation 404, the autonomous vehicle may input the sensor data into a localization component to determine localization data and auxiliary localization data associated with the autonomous vehicle. Additional details with respect to the autonomous vehicle inputting the sensor data into the localization component to determine the localization data and the auxiliary localization data are discussed in connection with FIG. 1, as well as throughout this disclosure At operation 406, the autonomous vehicle may input the auxiliary localization data into a machine learned model to generate a performance metric. Additional details with respect to the autonomous vehicle inputting the auxiliary localization data into the machine learned model are discussed in connection with FIGS. 1 and 2, as well as throughout this disclosure.

At operation 408, the autonomous vehicle may receive a performance metric from the machine learned model. Additional details with respect to the autonomous vehicle receiving the performance metric are discussed in connection with FIG. 1, as well as throughout this disclosure.

At operation 410, the autonomous vehicle may determine whether the performance metric meets or exceeds a threshold. If yes, then at operation 412, the autonomous vehicle may perform an action based on the performance metric meeting or exceeding the threshold. Additional details with respect to the action are discussed in connection with FIG. 1, as well as throughout this disclosure. If no, then the autonomous vehicle may continue its current operations and continue to capture sensor data as illustrated in operation 402. It is noted by the arrows from operations 410 and 412 returning to operation 402, that process 400 is continuously performed by the autonomous vehicle during its operation.

Example Clauses

A: A system comprising: one or more processors; and one or more computer-readable media storing computer-executable instructions that, when executed, cause the one or more processors to perform operations comprising: receiving sensor data comprising first sensor data from a first sensor associated with an autonomous vehicle and second sensor data associated with a second sensor associated with the autonomous vehicle; inputting the sensor data into a localization component to determine a resultant localization and auxiliary localization data; inputting the auxiliary localization data into a machine learned model; receiving, from the machine learned model, a metric associated with a performance of the localization component; and performing, based at least in part on the metric, an action associated with the autonomous vehicle.

B: The system of paragraph A, wherein the localization component is associated with a first accuracy level, and wherein the machine learned model is trained using ground truth auxiliary localization determined via a remote localization component associated with a second accuracy level that is higher than the first accuracy level.

C: The system of paragraph A or B, wherein the machine learned model is trained based on training data generated by adding an error to the sensor data.

D: The system of any of paragraphs A-C, wherein performing the action comprises: determining that the metric meets or exceeds a threshold; and determining, based at least in part on the metric meeting or exceeding the threshold, to one or more of: stop the autonomous vehicle, modify a parameter of the autonomous vehicle, or send a signal to a remote operator.

E: The system of any of paragraphs A-D, wherein the auxiliary localization data comprises at least one of variance data, a latent parameter, or residual data.

F: One or more non-transitory computer-readable media comprising instructions that when executed by one or more processors cause the one or more processors to perform operations comprising: receiving sensor data from a first sensor and a second sensor associated with a vehicle; inputting the sensor data into a localization component to determine localization data and auxiliary localization data; inputting the auxiliary localization data into a machine learned model; receiving, from the machine learned model, a metric associated with a performance of the localization component; and performing, based at least in part on the metric, an action associated with the vehicle.

G: The one or more non-transitory computer-readable media of paragraph F, wherein the auxiliary localization data comprises at least one of variance data, a latent parameter, or residual data.

H: The one or more non-transitory computer-readable media of paragraph F or G, wherein performing the action comprises: determining that the metric meets or exceeds a threshold; and determining, based at least in part on the metric meeting or exceeding the threshold, to one or more of: stop the vehicle, modify a parameter of the vehicle, or send a signal to a remote operator.

I: The one or more non-transitory computer-readable media of paragraph H, wherein the threshold is a first threshold and the action is a first action comprising generating and storing a warning within log data associated with the vehicle or sending the signal to the remote operator, the operations further comprising: determining that the metric meets or exceeds a second threshold, wherein the second threshold is different than the first threshold; and performing, based at least in part on the metric meeting or exceeding the second threshold, a second action, wherein the second action comprises generating a safe stop trajectory.

J: The one or more non-transitory computer-readable media of any of paragraphs F-I, wherein the localization component is associated with a first accuracy level, and wherein a ground truth auxiliary localization is determined via a remote localization component associated with a second accuracy level that is higher than the first accuracy level.

K: The one or more non-transitory computer-readable media of paragraph J, wherein the machine learned model is trained based at least in part on determining a difference between the ground truth auxiliary localization and the auxiliary localization data, wherein the metric is determined based at least in part on the difference.

L: The one or more non-transitory computer-readable media of any of paragraphs F-K, wherein the machine learned model is trained based on training data generated by adding an error to the sensor data.

M: The one or more non-transitory computer-readable media of any of paragraphs F-L, wherein the auxiliary localization data comprises first auxiliary localization data and second auxiliary localization data; and wherein determining the metric comprises determining the metric as a weighted sum of the first auxiliary localization data and the second auxiliary localization data.

N: The one or more non-transitory computer-readable media of any of paragraphs F-M, wherein: the localization component is configured to determine the localization data based at least in part on data received within a sliding window of time; and the auxiliary localization data is determined based at least in part on the data received within the sliding window of time.

O: The one or more non-transitory computer-readable media of any of paragraphs F-N, the operations further comprising determining, based at least in part on the metric, an error associated with a localization of the vehicle.

P: A method comprising: receiving sensor data from a first sensor and a second sensor associated with a vehicle; inputting the sensor data into a localization component to determine localization data and auxiliary localization data; inputting the auxiliary localization data into a machine learned model; receiving, from the machine learned model, a metric associated with a performance of the localization component; and performing, based at least in part on the metric, an action associated with the vehicle.

Q: The method of paragraph P, wherein performing the action comprises: determining that the metric meets or exceeds a threshold; and determining, based at least in part on the metric meeting or exceeding the threshold, to one or more of: stop the vehicle, modify a parameter of the vehicle, or send a signal to a remote operator.

R: The method of paragraph Q, wherein the threshold is a first threshold and the action is a first action comprising generating and storing a warning within log data associated with the vehicle or sending the signal to the remote operator, the method further comprising: determining that the metric meets or exceeds a second threshold, wherein the second threshold is different than the first threshold; and performing, based at least in part on the metric meeting or exceeding the second threshold, a second action, wherein the second action comprises generating a safe stop trajectory.

S: The method of any of paragraphs P-R, wherein the machine learned model is trained based on training data generated by adding an error to the sensor data.

T: The method of any of paragraphs P-S, wherein the auxiliary localization data comprises first auxiliary localization data and second auxiliary localization data; and wherein determining the metric comprises determining the metric as a weighted sum of the first auxiliary localization data and the second auxiliary localization data.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing computer-executable instructions that, when executed, cause the one or more processors to perform operations comprising:
receiving sensor data comprising first sensor data from a first sensor associated with an autonomous vehicle and second sensor data associated with a second sensor associated with the autonomous vehicle;
inputting the sensor data into a localization system associated with the autonomous vehicle by fusing the first sensor data and the second sensor data in part to determine localization data and auxiliary localization data, the auxiliary localization data comprising at least one of variance data, a latent parameter, or residual data;
inputting the auxiliary localization data into a machine learned model;
receiving, from the machine learned model, a metric associated with a performance of the localization system associated with the autonomous vehicle; and
performing, based at least in part on the metric, an action associated with the autonomous vehicle, the action comprising adjusting at least one of a braking force of the autonomous vehicle, a braking distance of the autonomous vehicle, or a maximum speed of the autonomous vehicle; and
controlling the autonomous vehicle based at least in part on the action.

2. The system of claim 1, wherein the localization system is associated with a first accuracy level, and wherein the machine learned model is trained in part by using ground truth auxiliary localization data determined via a remote localization system associated with a second accuracy level that is higher than the first accuracy level.

3. The system of claim 1, wherein the machine learned model is trained based in part on training data generated by adding an error to the sensor data.

4. The system of claim 1, wherein performing the action further comprises:
determining that the metric meets or exceeds a threshold; and
determining, based at least in part on the metric meeting or exceeding the threshold, to perform one or more of:
stop the autonomous vehicle,
modify a parameter of the autonomous vehicle, or
send a signal to a remote operator.

5. The system of claim 1, wherein the metric is a first metric, the operations further comprising:
determining, based at least in part on the first sensor data and the second sensor data, first auxiliary localization data associated with a first threshold and second auxiliary localization data associated with a second threshold;
inputting the first auxiliary localization data and the second auxiliary localization data into the machine learned model; and
receiving, from the machine learned model, a second metric associated with a performance of the localization system.

6. The system of claim 1, wherein:
the localization system is configured to determine the localization data based at least in part on data received within a sliding window of time; and
the auxiliary localization data is determined based at least in part on the data received within the sliding window of time.

7. One or more non-transitory computer-readable media comprising instructions that when executed by one or more processors cause the one or more processors to perform operations comprising:
receiving sensor data comprising first sensor data from a first sensor associated with a vehicle and second sensor data from a second sensor associated with the vehicle;
inputting the sensor data into a localization system associated with the vehicle in part by fusing the first sensor data and the second sensor data to determine localization data and auxiliary localization data, the auxiliary localization data comprising at least one of variance data, a latent parameter, or residual data;
inputting the auxiliary localization data into a machine learned model;
receiving, from the machine learned model, a metric associated with a performance of the localization system;
performing, based at least in part on the metric, an action associated with the vehicle, the action comprising adjusting at least one of a braking force of the vehicle, a braking distance of the vehicle, or a maximum speed of the vehicle; and controlling the vehicle based at least in part on the action.

8. The one or more non-transitory computer-readable media of claim 7, wherein performing the action further comprises:
  determining that the metric meets or exceeds a threshold; and
  determining, based at least in part on the metric meeting or exceeding the threshold, to perform one or more of:
    stop the vehicle,
    modify a parameter of the vehicle, or
    send a signal to a remote operator.

9. The one or more non-transitory computer-readable media of claim 8, wherein the threshold is a first threshold and the action is a first action comprising generating and storing a warning within log data associated with the vehicle or sending a signal to the remote operator, the operations further comprising:
  determining that the metric meets or exceeds a second threshold, wherein the second threshold is different than the first threshold; and
  performing, based at least in part on the metric meeting or exceeding the second threshold, a second action, wherein the second action comprises generating a safe stop trajectory.

10. The one or more non-transitory computer-readable media of claim 7, wherein the localization system is associated with a first accuracy level, and wherein ground truth auxiliary localization data is determined via a remote localization system associated with a second accuracy level that is higher than the first accuracy level.

11. The one or more non-transitory computer-readable media of claim 10, wherein the machine learned model is trained based at least in part on determining a difference between the ground truth auxiliary localization data and the auxiliary localization data, wherein the metric is determined based at least in part on the difference.

12. The one or more non-transitory computer-readable media of claim 7, wherein the machine learned model is trained based on training data generated by adding an error to the sensor data.

13. The one or more non-transitory computer-readable media of claim 7, wherein the auxiliary localization data comprises first auxiliary localization data and second auxiliary localization data; and
  wherein determining the metric comprises determining the metric as a weighted sum of the first auxiliary localization data and the second auxiliary localization data.

14. The one or more non-transitory computer-readable media of claim 7, wherein:
  the localization system is configured to determine the localization data based at least in part on data received within a sliding window of time; and
  the auxiliary localization data is determined based at least in part on the data received within the sliding window of time.

15. The one or more non-transitory computer-readable media of claim 7, the operations further comprising determining, based at least in part on the metric, an error associated with a localization of the vehicle.

16. A method comprising:
  receiving sensor data comprising first sensor data from a first sensor associated with a vehicle and second sensor data from a second sensor associated with the vehicle;
  inputting the sensor data into a localization system associated with the vehicle by fusing the first sensor data and the second sensor data to determine localization data and auxiliary localization data, the auxiliary localization data comprising at least one of variance data, a latent parameter, or residual data;
  inputting the auxiliary localization data into a machine learned model;
  receiving, from the machine learned model, a metric associated with a performance of the localization system;
  performing, based at least in part on the metric, an action associated with the vehicle, the action comprising adjusting at least one of a braking force of the vehicle, a braking distance of the vehicle, or a maximum speed of the vehicle; and
  controlling the vehicle based at least in part on the action.

17. The method of claim 16, wherein performing the action further comprises:
  determining that the metric meets or exceeds a threshold; and
  determining, based at least in part on the metric meeting or exceeding the threshold, to perform one or more of:
    stop the vehicle,
    modify a parameter of the vehicle, or
    send a signal to a remote operator.

18. The method of claim 17, wherein the threshold is a first threshold and the action is a first action comprising generating and storing a warning within log data associated with the vehicle or sending the signal to the remote operator, the method further comprising:
  determining that the metric meets or exceeds a second threshold, wherein the second threshold is different than the first threshold; and
  performing, based at least in part on the metric meeting or exceeding the second threshold, a second action, wherein the second action comprises generating a safe stop trajectory.

19. The method of claim 16, wherein the machine learned model is trained based at least in part on training data generated by adding an error to the sensor data.

20. The method of claim 16, wherein the auxiliary localization data comprises first auxiliary localization data and second auxiliary localization data; and
  wherein determining the metric comprises determining the metric as a weighted sum of the first auxiliary localization data and the second auxiliary localization data.

* * * * *